April 5, 1966   C. H. WIKLUND   3,244,273
SLIDE STORAGE CASE
Filed July 15, 1963   4 Sheets-Sheet 1

INVENTOR.
CARL H. WIKLUND
BY
ATTORNEY

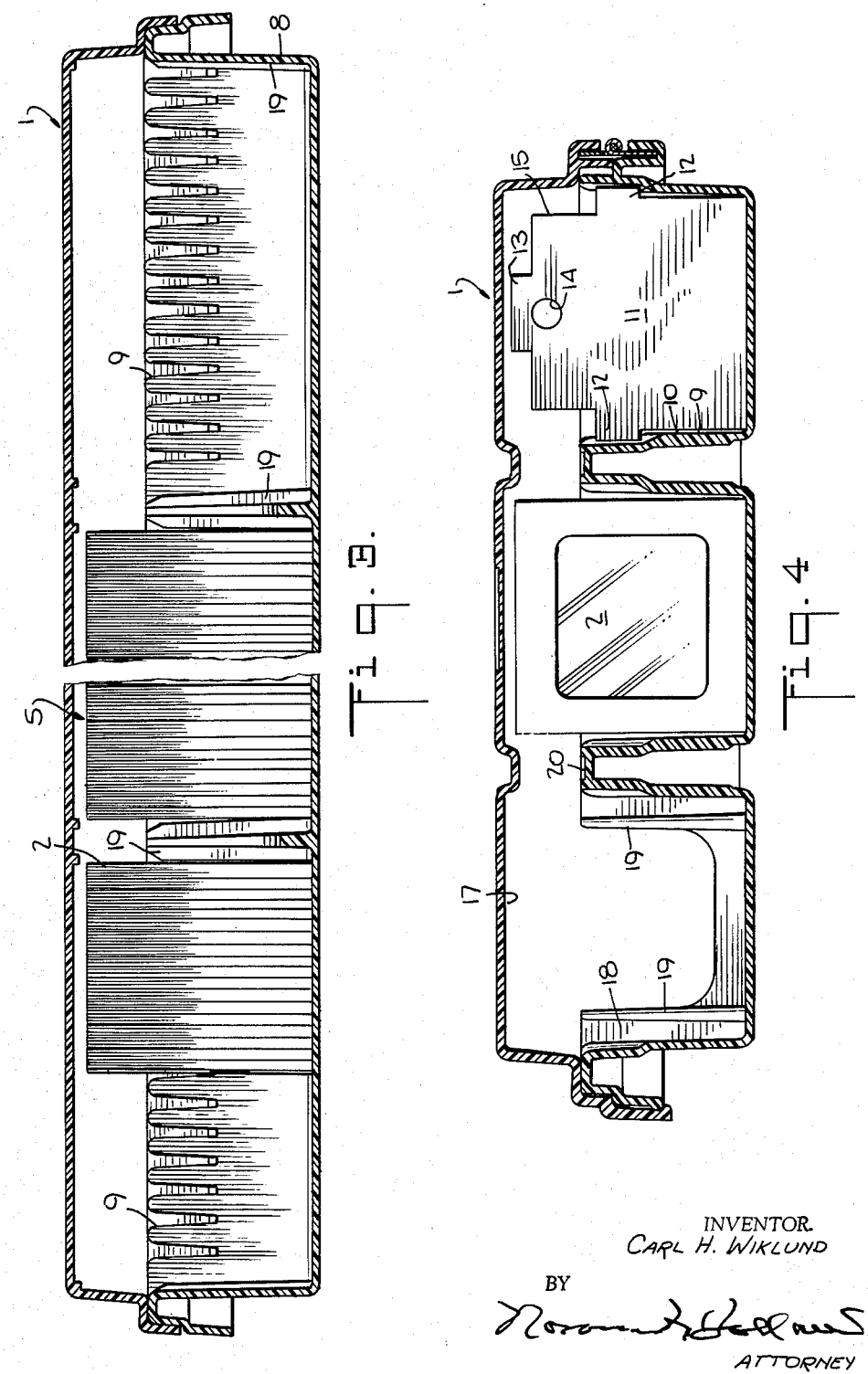

April 5, 1966 C. H. WIKLUND 3,244,273
SLIDE STORAGE CASE
Filed July 15, 1963 4 Sheets-Sheet 3
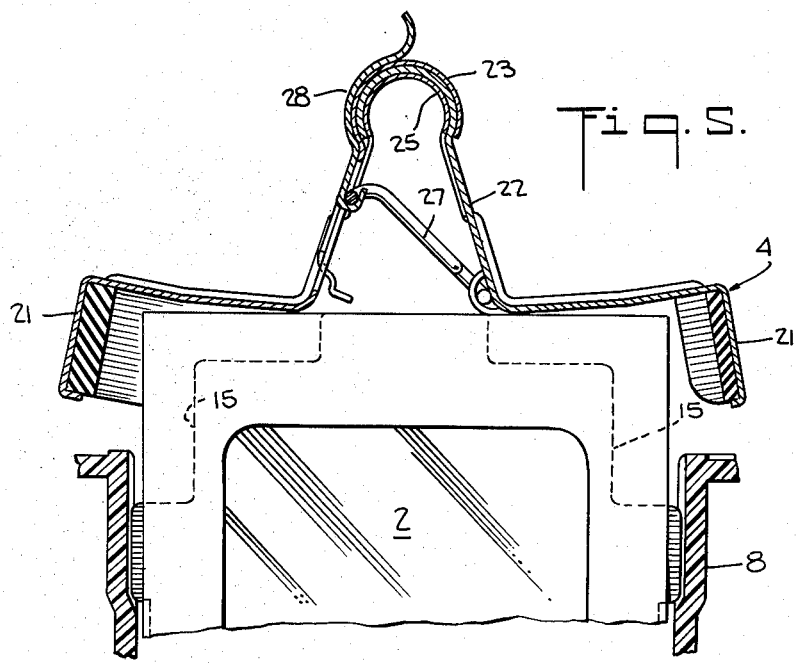
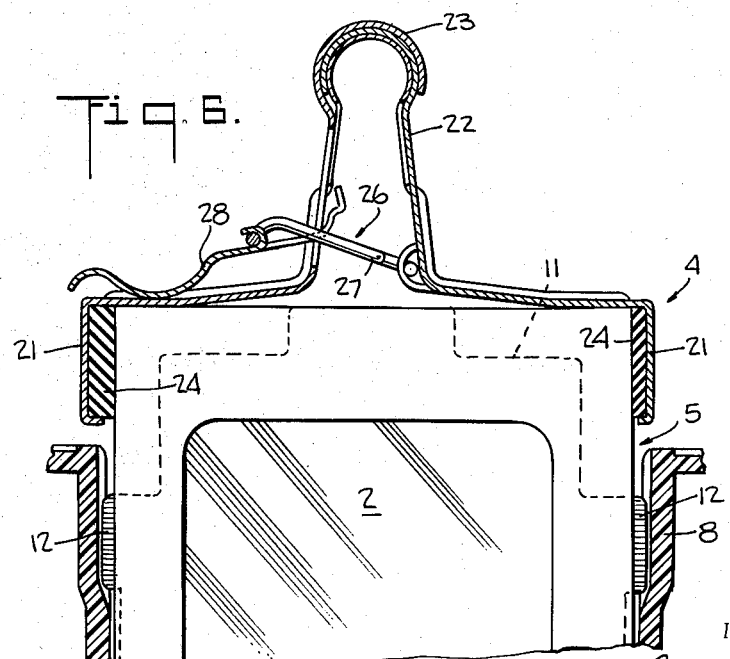
INVENTOR.
CARL H. WIKLUND
BY
ATTORNEY

INVENTOR.
CARL H. WIKLUND
BY
ATTORNEY

United States Patent Office 3,244,273
Patented Apr. 5, 1966

3,244,273
SLIDE STORAGE CASE
Carl H. Wiklund, Brookfield, Conn., assignor, by mesne assignments, to Airequipt, Inc., New Rochelle, N.Y., a corporation of New York
Filed July 15, 1963, Ser. No. 294,915
1 Claim. (Cl. 206—62)

The present invention relates to an improved method and means for handling photographic slides and more particularly to a method and means for storing photographic slides in a compact storage receptacle and for transferring the slides in order from the receptacle to a slide projector in relatively large and prearranged groups.

Slides of this general type, such as the well-known transparent slides mounted in cardboard frames, are exhibited most conveniently by automatic projectors which receive a group of slides and which project the slides in sequence in an automatic or semi-automatic slide changer. It is common practice to facilitate such exhibition by storing the groups of slides in individual trays known as magazines. These magazines have individual compartments into which the slides are arranged and the magazines serve both for storage and for automatic exhibition. Such magazines, however, require considerable storage space and also represent an appreciable cost in themselves where they may be required in large quantities. It is, therefore, desirable in many instances to have a system which eliminates the requirement for the magazines and which at the same time permits slides to be both stored and exhibited conveniently in prearranged sequences.

Accordingly, an object of the present invention is to provide such a magazineless system permitting compact and inexpensive storage while at the same time providing a convenient method of transferring predetermined groups of slides to the feed plate of a magazineless changer. Such a changer is described, for example, in application Serial No. 279,073 filed May 9, 1963, and owned by the assignee of the present invention.

Another object of the present invention is to provide improved slide storage compartment adapted to hold slides in sequence in definite groupings and with the slides positioned for ready removal from the compartment.

Another object of the present invention is to provide an improved slide transfer device which may be deftly and easily manipulated in transferring slides between a projector and a storage compartment.

Another object of the present invention is to provide an efficient and inexpensive means of storing and exhibiting slides in a prearranged program.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

Figure 1:
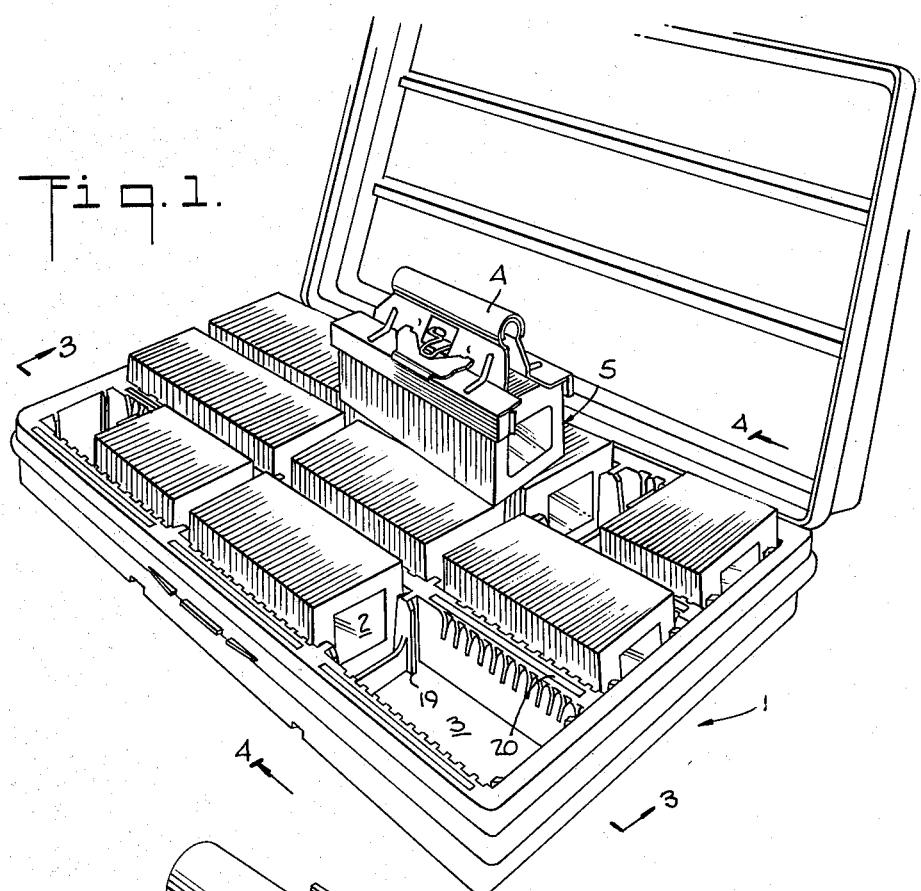
FIG. 1 is a perspective view illustrating the storage and transfer means of the present invention.
Figure 7:
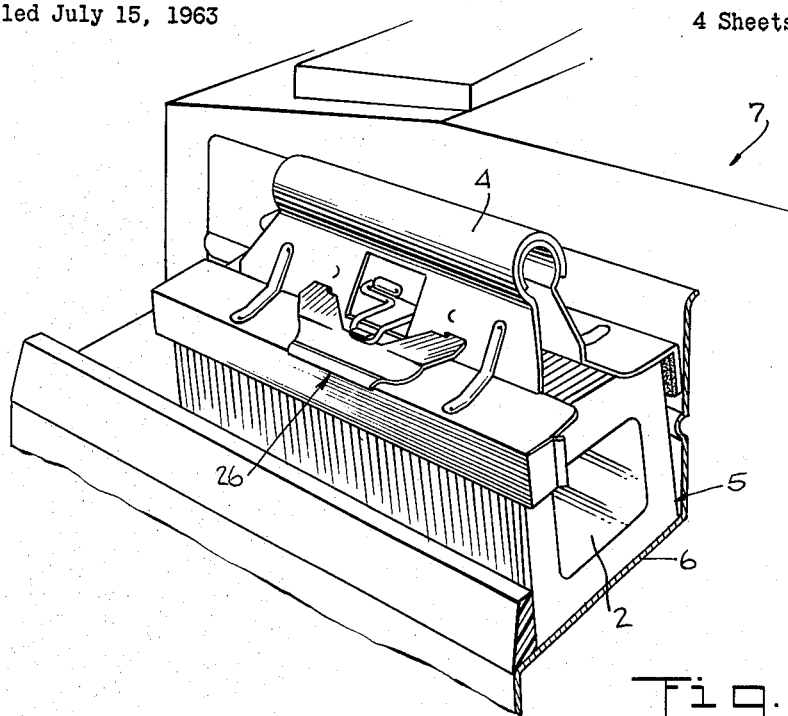
Figure 8:
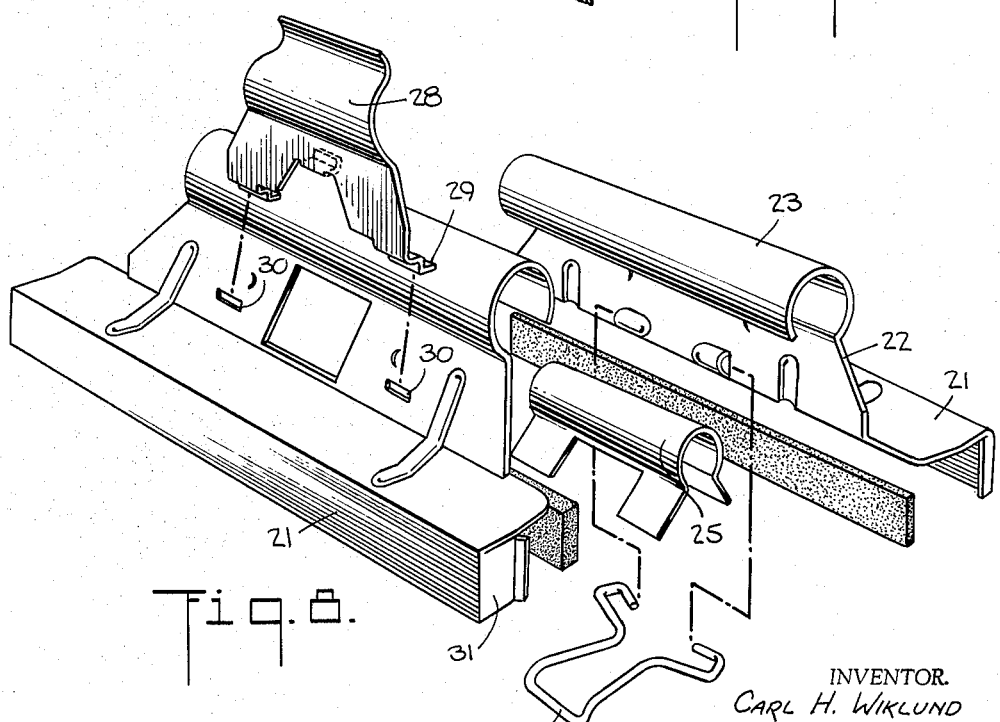

FIGS. 3 and 4 are sectional views of the storage means taken along lines 3—3 and 4—4 of FIG. 1;

FIG. 5 is a vertical sectional view of the slide transfer means at the commencement of a slide transferring operation;

FIG. 6 is a vertical sectional view of the slide transfer means corresponding to FIG. 5 and after a group of slides has been engaged; and FIG. 7 is a perspective view of the slide transfer means depositing a group of slides on a slide projector feed plate;

FIG. 8 is an exploded perspective view of the slide transfer means.

The method and means for handling the slides will now be described generally and with particular reference to FIGS. 1 and 7.

FIG. 1 illustrates a file case 1 in which the slides or transparencies 2 are filed in preselected arrangements. The file case 1 is divided into a convenient number of compartments such as the nine compartments 3 illustrated in the file case 1. The compartments 3 are proportioned to receive the slides 2 in solid stacks to minimize the storage space required and a file case 1 such as that illustrated may contain as many as 75 slides in each compartment and thus store a total of 675 slides in a relatively small overall case size of, for example, about twelve inches by eight inches by three inches.

In addition to providing for the storage of a large number of slides 2 in a small volume, a feature of the file case 1 of the present invention is the convenience with which the slide 2 may be removed and returned to the case and also the facility with which various groups of slides of differing sizes may be arranged in preselected order for storage and for viewing and for convenient handling between the slide file 1 and the feed plate or exit chute of a slide projector. A slide handler 4 is provided to engage and grip a stack 5 of slides 2 within the file case 1 and is then used to transport the gripped stack 5 to the feed plate 6 of a slide projector 7 as illustrated in FIG. 7. The slide handler 4, a preferred embodiment of which will be described further below, is applied to the top portion of a stack 5 of slides and is locked into position in firm gripping relationship with the slides 2 so that the slides 2 may be transferred to and from the slide projector 7 in their desired arrangement in a stack including a few to as many as about seventy-five slides without any danger of the slides being bent or dropped or mixed up during the transfer.

In order to expose the upper portions of the stacked slides 2 in the file case 1 to the slide handler 4, the lower portion 8 of the file case 1 is made only a fraction of the slide height as best illustrated in FIGS. 5 and 6. This permits the slide handler 4 to be positioned over the slides 2 as they rest in their fully stored position as seen in FIG. 5 and to be closed into gripping relation to withdraw the stack of slides 5 as illustrated in FIG. 6. The slide handler 4 is proportioned so that it will handle a full stack of slides from one storage compartment 3. However, at times, it is desirable to handle a stack of slides of lesser number. For this purpose each of the slide handling compartments in the file case has a series of opposed grooves 9 formed on the longtiudinal side walls 10 for receiving the slide positioners 11 as best illustrated in FIGS. 3 and 4.

The slide positioners 11 are proportioned to slide down into a compartment 3 and to be retained at the desired position by a pair of flanges 12 which are received in the positioning grooves 9. A gripping tab 13 and an aperture 14 are provided at the tops of the slide positioners 11 to facilitate their removal.

As seen in FIG. 5, the slide positioners 11 have cutouts 15 in their top edges so that they are not engaged by the slide handler 4 when the slides 2 are removed and thus remain in position for the return of the slides to the file case 1.

The file case 1 is preferably provided with a hinged cover 16 having shallow compartments 17 conforming generally to the stack sizes of the stored slides 2 to help retain the slides 2 in position during transport of the file case 1.

In order to facilitate the removal and return of slides 2 from the file case 1, the ends 18 of the compartments 3 each have a pair of inclined rails 19 which slidably engage the edge portions only of the endmost slides and which direct the slides 2 into and out of the file case 1 and which prevent any undesirable contact between the transparency of the endmost slide and the file case walls.

A preferred embodiment of file case 1 has top and bottom portions molded as a single piece and in this manner the above described preferred features are easily and conveniently provided and give an attractive and relatively inexpensive file case. Recesses 20 are provided on the compartment 3 dividers for suitable labels.

As described above, the slide handler 4 transports the stacks of slides to and from the projector 7 by engaging upper portions only of the stacked slides. For this purpose the slide handler 4 has a pair of flange shaped gripping sections 21 which terminate in an upstanding hinge portion 22. The hinge portions 22 have complementary engaging semi-circular portions 23 which slideably engage each other to provide a hinged connection permitting the gripping sections 21 to be moved against and away from the stack of slides 5. A pair of resilient cushion members 24 are preferably fastened to the inner gripping surface of each gripping section 21 to provide a firm grip with the slides 2.

Figure 2:
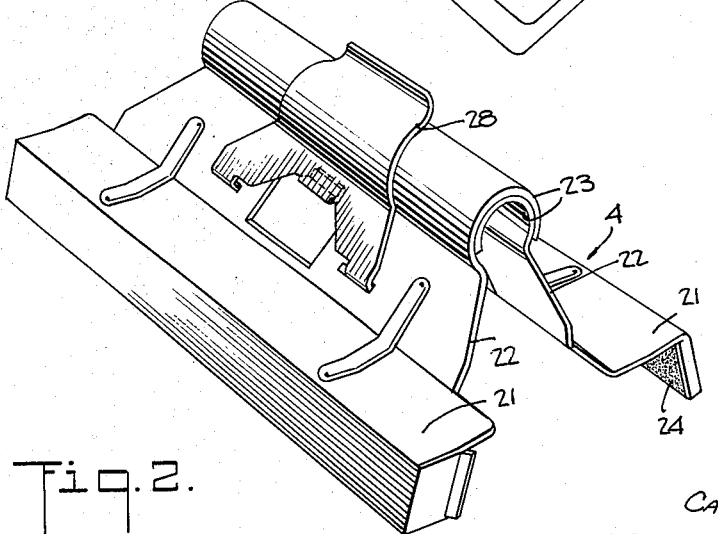
FIG. 2 is a perspective view of the transfer means.

In order to facilitate the manipulation of the slide handler 4 a spring member 25 is provided to urge the two portions apart and open as illustrated in FIGS. 2 and 5. A toggle 26 is provided to swing the gripping sections 21 to their gripping position as illustrated in FIGS. 1 and 6.

The togggle 26 includes a link member 27 pivotally attached at one end to one gripping section 21 and pivotally attached at its other end to a toggle lever 28. The toggle lever 28 is pivotally attached to the other gripping section 21 by spaced tabs 29 loosely mounted in a pair of correspondingly spaced slots 30. Movement of the toggle lever 28 from its open position adjacent the slide handler hinge portions 22 to its closed position adjacent one slide handler gripping section 21 as illustrated in FIG. 6 causes the slide handler 4 to remain in tight gripping relationship with a stack of slides. This permits the gripped slides to be transferred as a unit either from a file case compartment to the feed plate of a projector or vice versa by simultaneously gripping each of the slides in the stack while they are in a level position in the file case or on the projector. The use of the above described slide handler 4 prevents any relative motion between the slides such as tends to damage the slides when they are manually handled.

An end tab 31 is preferably provided on one of the slide handler gripping sections 21 so that it acts as a stop and positions the slide handler 4 correctly with the end slide of the stack properly positioned between the opposed resilient gripping elements 24 of the slide handler 4.

It will be seen that an improved method and means of storing and transferring slides has been provided wherein an extremely larger number of slides is stored in a small container or case and where a slide handler is used in cooperation with the filing case to facilitate the transfer of prearranged stacks of slides to and from the slide projector.

The method and means not only provides more compact storage but also provides for a rapid and efficient slide handling without the risk of damage to the slides and with little or no slide wear during the slide transfer operation.

As various changes may be made in the form, constructions and arrangement of the parts herein without departing from the spirit and scope of the invention and without sacrificing any of its advantages, it is to be understood that all matter herein is to be interpreted as illustrative and not in a limiting sense.

Having thus described my invention, I claim:

In a slide file case having a plurality of slide filing compartments defined by spaced side and end walls and each compartment adapted for receiving and storing stacks of photographic slides in pre-determined order for showing in a magazineless projector and with the slides being arranged in abutting face-to-face arrangement forming solid stacks and having a cover for enclosing the file case and enveloping the upper portion of the stored slides the improvement which comprises the compartment side and end walls having a height equal to only a portion of the height of the slides whereby a substantial portion of each stack of slides extends above the said walls, a plurality of plate-like stack positioners each having a lower portion with a width approximately equal to the width of the slide compartments and a height less than that of the slide compartments, each of said stack positioners having a top portion which extends above the tops of the compartment walls and being recessed inwardly on both sides, said recesses extending below the tops of said compartment side walls and forming a top center portion inwardly spaced from the side walls thereby permitting opposite sides of a stack of slides on both sides of the stack positioner to be gripped simultaneously and independently of the stack positioner, a plurality of support slots for said stack positioners spaced along each of the opposite side walls of said compartments adjustably retaining the positioners in a generally vertical position in the compartments to support solid stacks of slides of varying numbers of slides, tabs on opposite sides of the tops of the lower portions of the stack positioners in said slots, and a pair of generally vertical slide engaging members at the end walls of each compartment positioned to engage spaced edge portions of the endmost slides in the compartments.

References Cited by the Examiner

UNITED STATES PATENTS

| | | | |
|---|---|---|---|
| 2,368,978 | 2/1945 | Fink | 294—16 |
| 2,563,157 | 8/1951 | Castelli. | |
| 2,649,093 | 8/1953 | Rigney. | |
| 2,701,635 | 2/1955 | Mills | 206—73 |
| 2,781,125 | 2/1957 | Mills | 206—73 |
| 2,793,065 | 5/1957 | McCurry | 294—16 |
| 2,821,307 | 1/1958 | Linsley | 206—1 X |
| 2,829,767 | 4/1958 | Scriplure | 206—73 |
| 2,863,579 | 12/1958 | Meyer | 214—309 |
| 3,027,666 | 4/1962 | Briskin et al. | 206—73 X |
| 3,055,522 | 9/1962 | Cronquist | 214—309 |

FOREIGN PATENTS

| | | |
|---|---|---|
| 1,179,099 | 12/1958 | France. |
| 1,027,066 | 3/1958 | Germany. |
| 251,811 | 8/1948 | Switzerland. |

THERON E. CONDON, *Primary Examiner.*

HUGO O. SCHULZ, LOUIS G. MANCENE, *Examiners.*